US012803744B2

(12) United States Patent
Chen et al.

(10) Patent No.: US 12,803,744 B2
(45) Date of Patent: Nov. 17, 2026

(54) TCI STATE INDICATION FOR PUSCH TRANSMISSION

(71) Applicant: MEDIATEK INC., Hsinchu City (TW)

(72) Inventors: Yi-Ru Chen, Hsinchu City (TW); Cheng-Rung Tsai, Hsinchu City (TW)

(73) Assignee: MEDIATEK INC., Hsin-Chu (TW)

( * ) Notice: Subject to any disclaimer, the term of this patent is extended or adjusted under 35 U.S.C. 154(b) by 427 days.

(21) Appl. No.: 18/525,680

(22) Filed: Nov. 30, 2023

(65) Prior Publication Data

US 2024/0187185 A1 Jun. 6, 2024

Related U.S. Application Data

(60) Provisional application No. 63/386,180, filed on Dec. 6, 2022.

(51) Int. Cl.
*H04L 5/00* (2006.01)

(52) U.S. Cl.
CPC .......... *H04L 5/0051* (2013.01); *H04L 5/0091* (2013.01)

(58) Field of Classification Search
None
See application file for complete search history.

(56) References Cited

U.S. PATENT DOCUMENTS

2020/0389835 A1 12/2020 Talebi Fard
2021/0250890 A1 8/2021 Won
2021/0360594 A1 11/2021 Park ...................... H04W 72/04
2022/0201482 A1 6/2022 Ferdi
2025/0203629 A1* 6/2025 Liu ..................... H04W 72/232
2025/0233717 A1* 7/2025 Liu ................... H04W 72/1268

FOREIGN PATENT DOCUMENTS

WO WO2022082700 A1 10/2020

OTHER PUBLICATIONS

European Intellectual Property Office Action 23214330.5-1206, dated May 27, 2024.
Shinya Kumagai et al: "Discussion on Unified TCI Framework Extensionfor Multi-TRP".
USPTO Action 18129058 Dated Nov. 3, 2025.

* cited by examiner

*Primary Examiner* — Christine T Duong
(74) *Attorney, Agent, or Firm* — Helen Mao; Imperium Patent Works

(57) ABSTRACT

Method and user equipment (UE) are provided for the TCI state indication for PUSCH transmission. In one novel aspect, the UE maps PUSCH transmission with codebook/noncodebook-based TCI states based on codepoint for SRS resource set of DCI format 0_1 or DCI format 0_2. In one embodiment, UE applies the first or the second TCI state to all PUSCH transmission occasions when the codepoint is "00" or "01", respectively. When the codepoint is "10" or "11", the UE applies the first and the second indicated joint/UL TCI state to the PUSCH transmission occasions (s) associated with the first and second SRS resource set, respectively when no multi-panel scheme is configured; and when multi-panel scheme is configured with, such as "SDMscheme", UE applies the first and the second indicated joint/UL TCI state to the PUSCH antenna ports associated with the first and second SRS resource set, respectively.

14 Claims, 4 Drawing Sheets

TCI STATE INDICATION FOR PUSCH TRANSMISSION

CROSS REFERENCE TO RELATED APPLICATIONS

This application claims the benefit under 35 U.S.C. § 119 from U.S. provisional application Ser. No. 63/386,180, entitled "TCI STATE INDICATION FOR PUSCH TRANSMISSION," filed on Dec. 6, 2022, the subject matter of which is incorporated herein by reference.

TECHNICAL FIELD

The disclosed embodiments relate generally to wireless communication, and, more particularly, to transmission configuration indication (TCI) state indication for physical uplink shared channel (PUSCH) transmission.

BACKGROUND

In conventional network of 3rd generation partnership project (3GPP) 5G new radio (NR), the user equipment (UE) can be configured, by the network, with control resource sets (CORESETs), search space sets and transmission configuration indication (TCI) states. The UE can apply one or more TCI states for downlink reception and uplink transmission with a transmission reception point (TRP). In some scenarios, the UE may need to communicate with multiple TRPs. However, some details of applying the TCI states for multiple TRPs have not been determined and need to be further discussed.

SUMMARY

Method and user equipment (UE) are provided for the TCI state indication for PUSCH transmission. In one novel aspect, the UE maps PUSCH transmission with TCI states based on codepoint for SRS resource set of DCI format 0_1 or DCI format 0_2. In one embodiment, the PUSCH transmission is for PUSCH transmission occasions. In another embodiment, the PUSCH transmission is for PUSCH antenna ports. In one embodiment, the UE configures a first SRS resource set and a second SRS resource set, receives a TCI command indicating a first TCI state and a second TCI state, receives a DCI format 0_1 or DCI format 0_2, and maps the first TCI state, the second TCI state, or both the first TCI state and the second TCI state with at least one PUSCH transmission occasions or at least one PUSCH antenna port based on the codepoint for SRS resource set indicator indicated by the DCI format 0_1 or DCI format 0_2. In one embodiment, the first SRS resource set and the second SRS resource set are configured with usage for codebook or noncodebook. In one embodiment, UE applies the first TCI state to all PUSCH transmission occasions when the DCI format 0_1 or DCI format 0_2 indicates codepoint "00" for the SRS resource set indicator. The UE applies the second TCI state to all PUSCH transmission occasions when the DCI format 0_1 or DCI format 0_2 indicates codepoint "01" for the SRS resource set indicator. In another embodiment, when the DCI format 0_1 or DCI format 0_2 indicates codepoint "10" or "11" for the SRS resource set indicator, the mapping is further based on a multi-panel scheme of the UE. The UE applies the first TCI state to one or more PUSCH transmission occasions associated with the first SRS resource set and the second TCI state to one or more PUSCH transmission occasions associated with the second SRS resource set when the multi-panel scheme is not configured to the UE by the wireless network. The UE applies the first TCI state to one or more PUSCH antenna ports associated with the first SRS resource set and the second TCI state to one or more PUSCH antenna ports associated with the second SRS resource set when the multi-panel scheme is configured to the UE by the wireless network. In one embodiment, the multi-panel is configured with SDMscheme. In one embodiment, the first TCI state and the second TCI state are joint TCI state or UL TCI state. In another embodiment, the TCI command is carried by a DCI format 1_1 or DCI format 1_2 or MAC CE.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
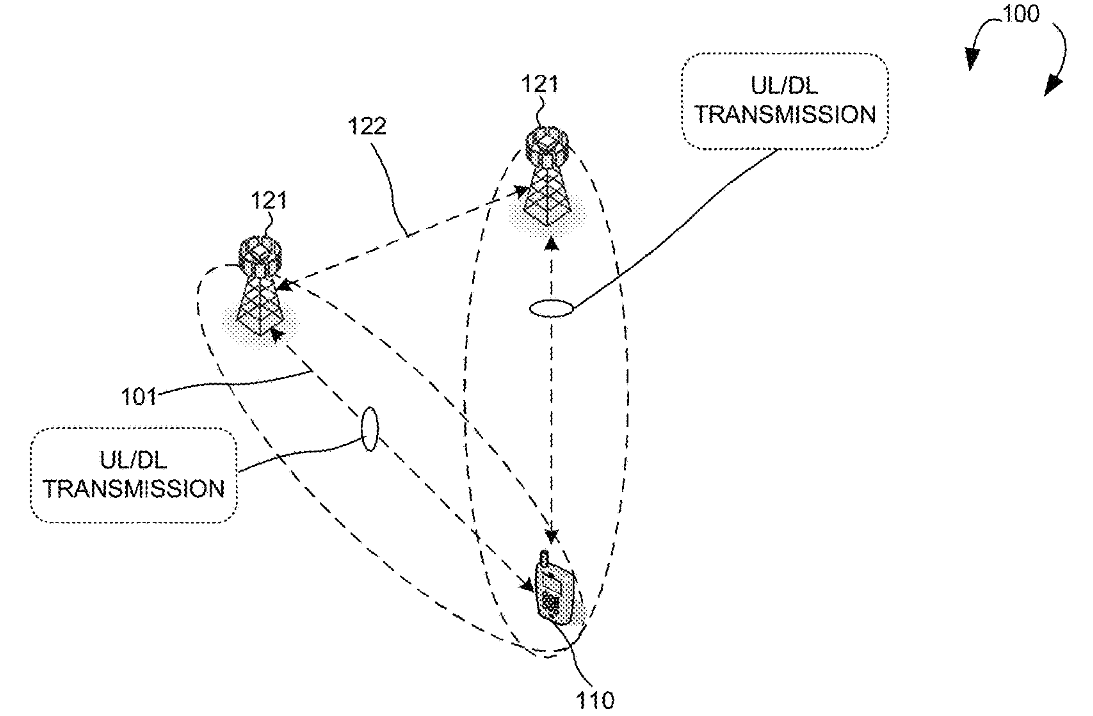
FIG. 1 illustrates an exemplary wireless network supporting TCI for multiple TRPs in accordance with embodiments of the current invention.

FIG. 1 illustrates an exemplary wireless network supporting TCI for multiple TRPs in accordance with embodiments of the current invention. The wireless network 100 includes a user equipment (UE) 110 communicatively connected to a plurality TRPs 121.

Each TRP 121 may provide radio access using a Radio Access Technology (RAT) (e.g., the 5G NR technology). The UE 110 may be a smart phone, a wearable device, an Internet of Things (IOT) device, and a tablet, etc. Alternatively, UE 110 may be a Notebook (NB) or Personal Computer (PC) inserted or installed with a data card which includes a modem and RF transceiver (s) to provide the functionality of wireless communication.

Each TRP 121 may provide communication coverage for a geographic coverage area in which communications with the UE 110 is supported via a communication link 101. The communication links 101 shown in the wireless network 100 may respectively include uplink (UL) transmissions from the UE 110 to the TRPs 121 (e.g., on the Physical Uplink Control Channel (PUCCH) or Physical Uplink Shared Channel (PUSCH)) or downlink (DL) transmissions from the TRPs 121 to the UE 110 (e.g., on the Physical Downlink Control Channel (PDCCH) or Physical Downlink Shared Channel (PDSCH)). The TRPs 121 may communicate with each other via a communication link 122.

Figure 2:
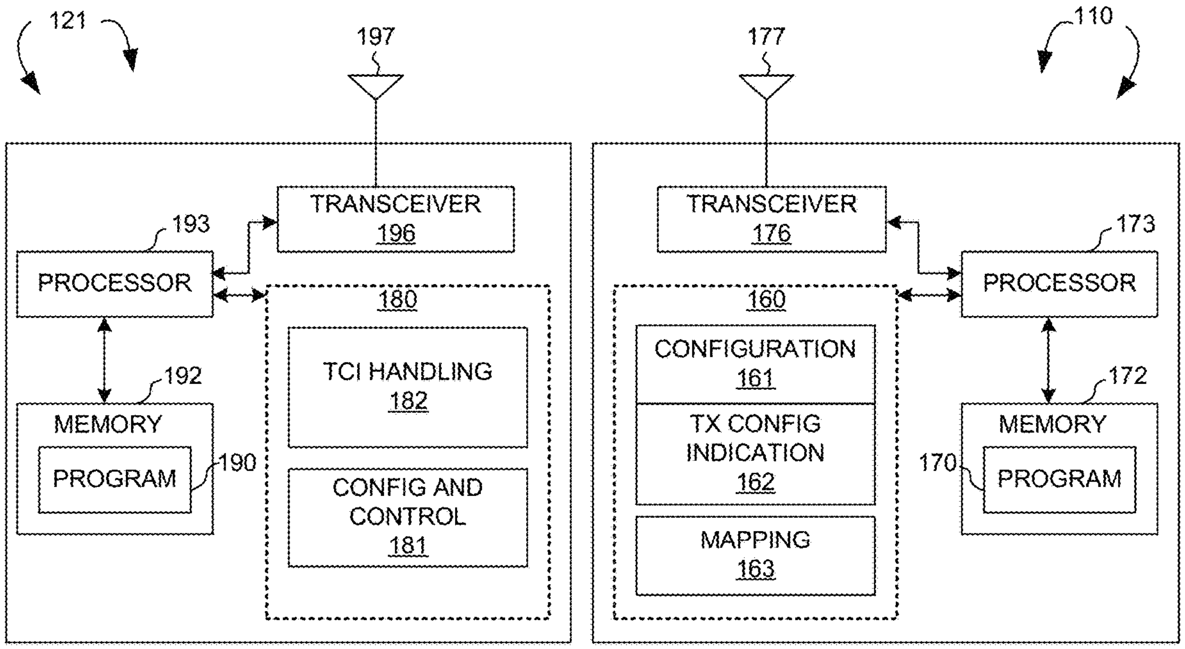
FIG. 2 is a simplified block diagram of the TRP and the UE in accordance with embodiments of the current invention.

FIG. 2 is a simplified block diagram of one TRP 121 and the UE 110 in accordance with embodiments of the present invention. For the TRP 121, an antenna 197 transmits and receives radio signal. A radio frequency (RF) transceiver 196, coupled with the antenna, receives RF signals from the antenna, converts them to baseband signals and sends them to processor 193. RF transceiver 196 also converts received baseband signals from the processor 193, converts them to RF signals, and sends out to antenna 197. Processor 193 processes the received baseband signals and invokes different functional modules and circuits to perform features in the TRP 121. Memory 192 stores program instructions and data 190 to control the operations of the TRP 121.

Similarly, for the UE 110, antenna 177 transmits and receives RF signals. RF transceiver 176, coupled with the antenna, receives RF signals from the antenna, converts them to baseband signals and sends them to processor 173. The RF transceiver 176 also converts received baseband signals from the processor 173, converts them to RF signals, and sends out to antenna 177. Processor 173 processes the received baseband signals and invokes different functional modules and circuits to perform features in the UE 110. Memory 172 stores program instructions and data 170 to control the operations of the UE 110. Although a specific number of transceiver 176 and antenna 177 are depicted in FIG. 2, it is contemplated that any number of transceiver 176 and antenna 177 may be included in the UE 110 for communicating with multiple TRPs 121 simultaneously.

The TRP 121 and the UE 110 also include several functional modules and circuits that can be implemented and configured to perform embodiments of the present invention. In the example of FIG. 2, the TRP 121 includes a set of control functional modules and circuit 180. TCI handling circuit 182 handles TCI and associated network parameters for the UE 110. Configuration and control circuit 181 provides different parameters to configure and control the UE 110. The UE 110 includes a set of control functional modules and circuit 160. Configuration module 161 receives a configuration including at least a first sounding reference signal (SRS) resource set and a second SRS resource set from a wireless network. In one embodiment, the UE is configured with multiple serving beams with at least a first serving transmission and reception point (TRP) and a second serving TRP. Transmission configuration indication module 162 receives a TCI command from the wireless network indicating a first TCI state and a second TCI state. Mapping module 163 receives a downlink control information (DCI) format 0_1 or DCI format 0_2 from wireless network and maps the first TCI state, the second TCI state, or both the first TCI state and the second TCI state with at least one physical uplink shared channel (PUSCH) transmission occasion or at least one PUSCH antenna port based on a codepoint for an SRS resource set indicator indicated by the DCI format 0_1 or 0_2.

Note that the different functional modules and circuits can be implemented and configured by software, firmware, hardware, and any combination thereof. The function modules and circuits, when executed by the processors 193 and 173 (e.g., via executing program codes 190 and 170), allow the TRPs 121 and the UE 110 to perform embodiments of the present invention.

Figure 3:
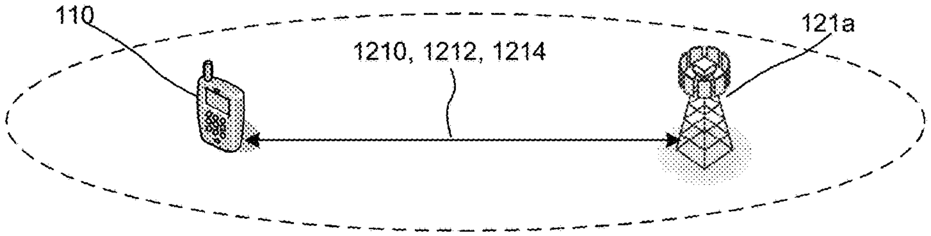
FIG. 3 illustrates a top-level of message transmissions for multiple TCI states for a UE with multiple serving TRPs in accordance with embodiments of the current invention.

FIG. 3 illustrates a top-level of message transmissions for multiple TCI states for a UE with multiple serving TRPs in accordance with embodiments of the current invention. In general, the TRP 121*a* transmits a radio resource control (RRC) configuration 1210 of a control resource set (CORESET) or a PUCCH resource to the UE 110. The UE 110 receives the RRC configuration 1210 from the TRP 121*a*. The RRC configuration 1210 indicates to the UE 110 multiple transmission configuration indication (TCI) states.

The TRP 121*a* transmits an activation command 1212 (e.g., a MAC-CE) to the UE 110. The UE 110 receives the activation command 1212 from the TRP 121*a*. The activation command 1212 is used for the UE 110 to activate subsets of the multiple TCI states.

The TRP 121*a* transmits a downlink control information (DCI) 1214 to the UE 110. The UE 110 receives the DCI 1214 from the TRP 121*a*. The DCI 1214 indicates to the UE 110 to determine at least one TCI state from the subset (s) of the multiple TCI states as serving TCI (s).

In some embodiments, the RRC configuration 1210 indicates to the UE 110 multiple TCI states which is a general TCI state list associated with both DL reception and UL transmission. The activation command 1212 indicates to the UE 110 two subsets of the multiple TCI states. One of the subsets is a first list of active TCI states, which includes a plurality of first TCI states. The other of the subsets is a second list of active TCI states, which includes a plurality of second TCI states. Each of the first TCI states and the second states may be applied for DL reception and UL transmission.

In other words, after receiving the activation command 1212, the UE 110 determines the first TCI states and the second TCI states from the general TCI state list according to the activation command 1212.

More specifically, the UE 110 determines the first TCI states and the second TCI states from the general TCI state list by: (1) mapping the first TCI states to a plurality of first TCI field codepoints; and (2) mapping the second TCI states to a plurality of second TCI field codepoints. The first TCI field codepoints and the first TCI states may be one-to-one mapped. The second TCI field codepoints and the second TCI states may be one-to-one mapped.

Figure 4:
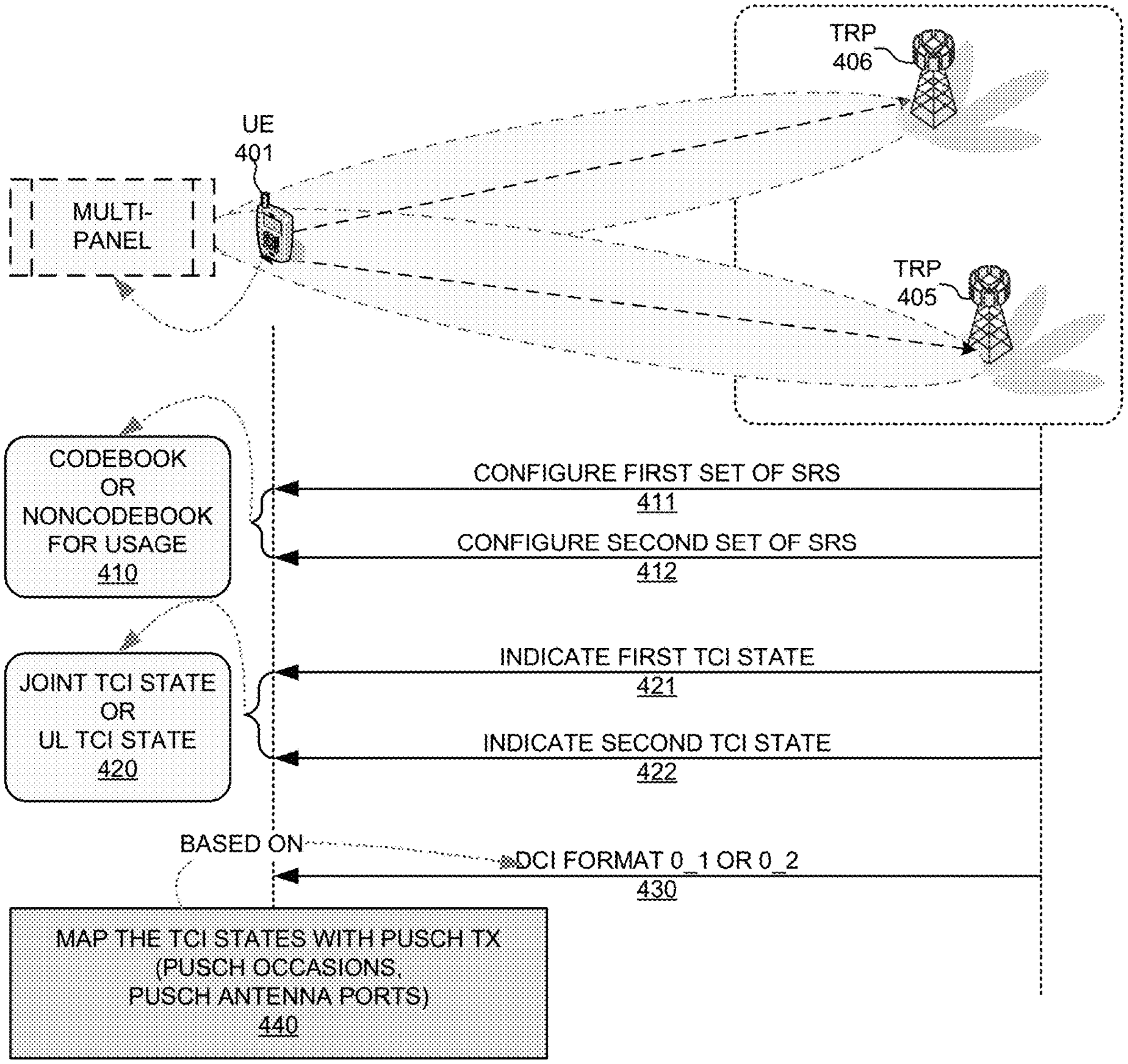
FIG. 4 illustrates exemplary diagrams for top-level procedures for the UE to map the PUSCH transmission with TCI states based on DCI messages in accordance with embodiments of the current invention.

FIG. 4 illustrates exemplary diagrams for top-level procedures for the UE to map the PUSCH transmission with TCI states based on DCI messages in accordance with embodiments of the current invention. In one novel aspect, PUSCH transmission is mapped with TCI state based on DCI messages for the UE communicating with multiple TRPs. UE 401 communicates with multiple TRPs, such as TRP 405 and TRP 406. In one embodiment, UE 401 is equipped and/or configured with multiple panels. UE 401 supports multi-beam communication with TRPs 405 and 406. In one embodiment, UE 401 is configured with multiple serving beams from TRP 405 and TRP 406, respectively. In one embodiment, the multiple beams of TRP 405 and TRP 406 are in a single cell. In another embodiment, the multiple beams of TRP 405 and 406 are from different cells.

In one embodiment, UE 401 is configured with at least two SRS resource sets. At step 411, UE 401 is configured with the first SRS resource set. At step 412, UE 401 is configured with the second SRS resource set. In one embodiment 410, the first SRS resource set and the second SRS resource set are codebook-based or noncodebook-based.

The first SRS resource set and the second SRS resource set are configured with usage parameter set to be "codebook" or "noncodebook".

UE 401 is configured with multiple TCI states for the multi-TRP communication. In one embodiment, UE 401 receives TCI command to indicate/activate at least two TCI states. At step 421, the network indicates a first TCI state to UE 401. At step 422, the network indicates a second TCI state to UE 401. In one embodiment, the TCI command is carried by DCI message, such as DCI format 1_1 or DCI format 1_2. In another embodiment, the TCI command is carried by MAC control element (CE). In one embodiment 420, the UE is indicated with joint TCI state or UL TCI state for the mapping of the PUSCH. When the serving cell is configured with joint DL/UL TCI mode, i.e., unifiedTCI-StateType="joint", the UE is indicated with joint TCI state. For example, DCI format 1_1 or DCI format 1_2 or MAC CE indicates $1^{st}$ joint TCI state and $2^{nd}$ joint TCI state to UE 401. When the serving cell is configured with separate DL/UL TCI mode, i.e., unifiedTCI-StateType="separate", the UE is indicated with separate DL/UL TCI mode. For example, DCI format 1_1 or DCI format 1_2 or MAC CE indicates $1^{st}$ DL TCI state, $1^{st}$ UL TCI state, $2^{nd}$ DL TCI state, and $2^{nd}$ UL TCI state.

In one novel aspect, UE maps PUSCH transmission with TCI state based on DCI messages. At step 430, UE 401 receives DCI format 0_1 or DCI format 0_2. At step 440, UE maps the TCI states with PUSCH transmission based on the received DCI format 0_1 or DCI format 0_2. In one scenario, the UE communicates with multiple TRPs in TDM mode. In another scenario, the UE communicates with multiple TRPs in SDM mode. In one embodiment, the PUSCH transmission maps PUSCH occasions with TCI states. In another embodiment, the PUSCH transmission maps PUSCH antenna ports with TCI states.

Figure 5:
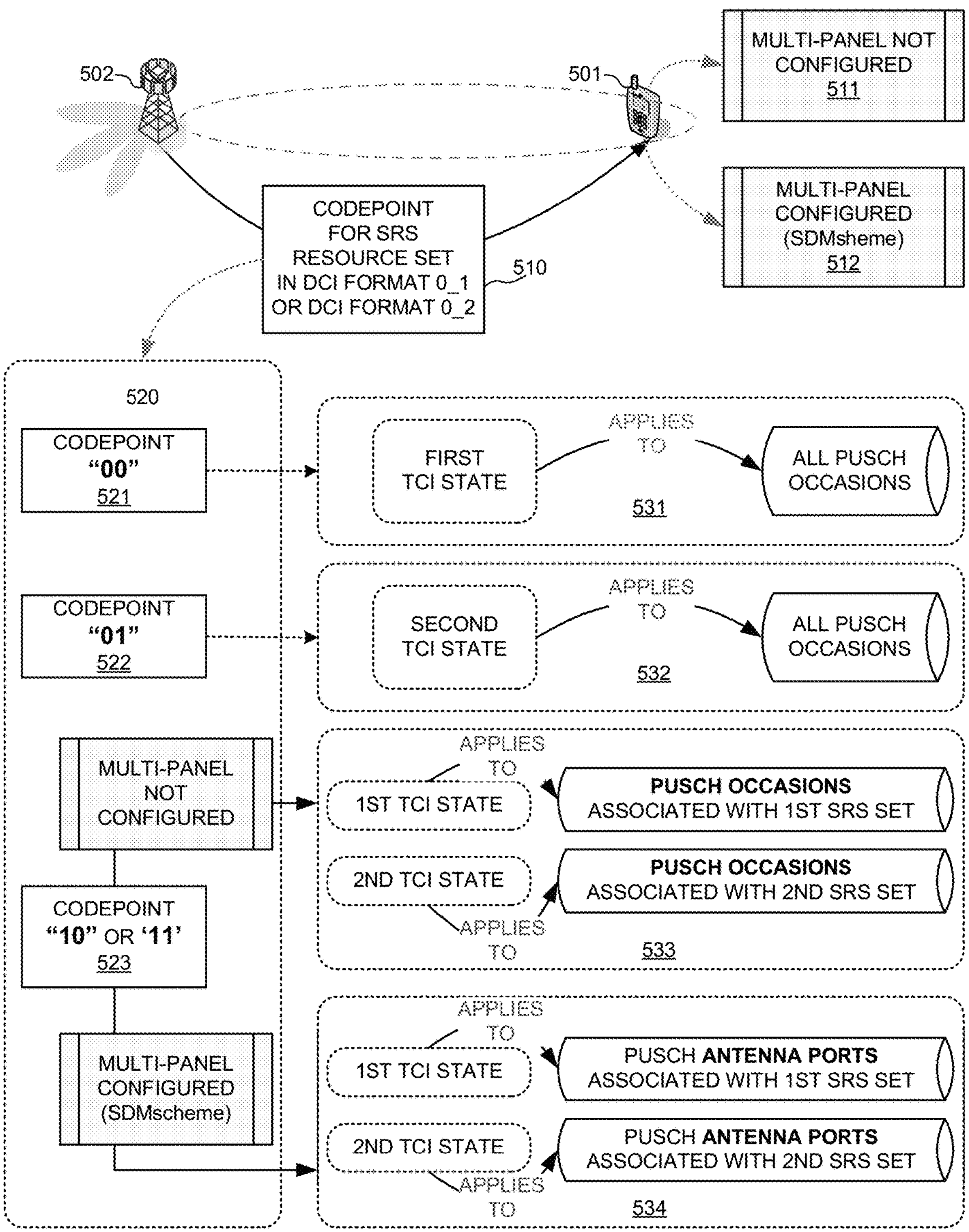
FIG. 5 illustrates exemplary diagrams for the mapping of PUSCH transmission based on codepoint for SRS resource set in DCI format 0_1 or DCI format 0_2 in accordance with embodiments of the current invention.

FIG. 5 illustrates exemplary diagrams for the mapping of PUSCH transmission based on codepoint for SRS resource set in DCI format 0_1 or DCI format 0_2 in accordance with embodiments of the current invention. UE 501 communicates with multiple TRPs, such as TRP 502 in a wireless network. In one embodiment 511, multi-panel is not configured for UE 501. In another embodiment 512, multi-panel is configured for UE 501, such as multi-panel is configured as SDMscheme. At step 510, UE 501 receives DCI format 0_1 or DCI format 0_2 from the network and decodes codepoint for SRS resource set. In one novel aspect, the UE maps PUSCH transmission to TCI states based on the codepoint for SRS resource set in DCI format 0_1 or DCI format 0_2. The codepoint for SRS resource set 520 can be set to "00" 521, "01" 522, "10" or "11" 523. In scenario 531, a DCI format 0_1 or DCI format 0_2 indicates codepoint "00" for the SRS resource set indicator, the UE applies the first indicated joint/UL TCI state to all PUSCH transmission occasions (s). In scenario 532, a DCI format 0_1 or DCI format 0_2 indicates codepoint "01" for the SRS resource set indicator, the UE applies the second indicated joint/UL TCI state to all PUSCH transmission occasions (s).

In one embodiment, the DCI format 0_1 or DCI format 0_2 indicates codepoint "10" or "11" (523) for SRS resource set indicator, and wherein the PUSCH transmission mapping is further based on a multi-panel scheme of the UE. The UE determines a transmission scheme based on the configuration. A first transmission schemed is determined when two SRS resource sets are configured with usage for "codebook" or "noncodebook" and multi-panel scheme is not configured. A second transmission scheme is determined when two SRS resource sets are configured with usage for "codebook" or "noncodebook" and multi-panel scheme is configured and set to "SDMscheme". In scenario/configuration 533 for the first transmission scheme, the UE applies the first indicated joint/UL TCI state to the PUSCH transmission occasions (s) associated with the first SRS resource set, and the second indicated joint/UL TCI state to the PUSCH transmission occasions (s) associated with the second SRS resource set. In configuration 534 for the second transmission scheme, the UE applies the first indicated joint/UL TCI state to the PUSCH antenna port (s) associated with the first SRS resource set, and the second indicated joint/UL TCI state to the PUSCH antenna port (s) associated with the second SRS resource set. In one example, the PUSCH antenna port (s) is associated with the first SRS resource set if the PUSCH antenna port (s) corresponds to the SRS port (s) of the indicated SRS resource in the first SRS resource set. In another example, the PUSCH antenna port (s) is associated with the second SRS resource set if the PUSCH antenna port (s) corresponds to the SRS port (s) of the indicated SRS resource in the second SRS resource set.

Figure 6:
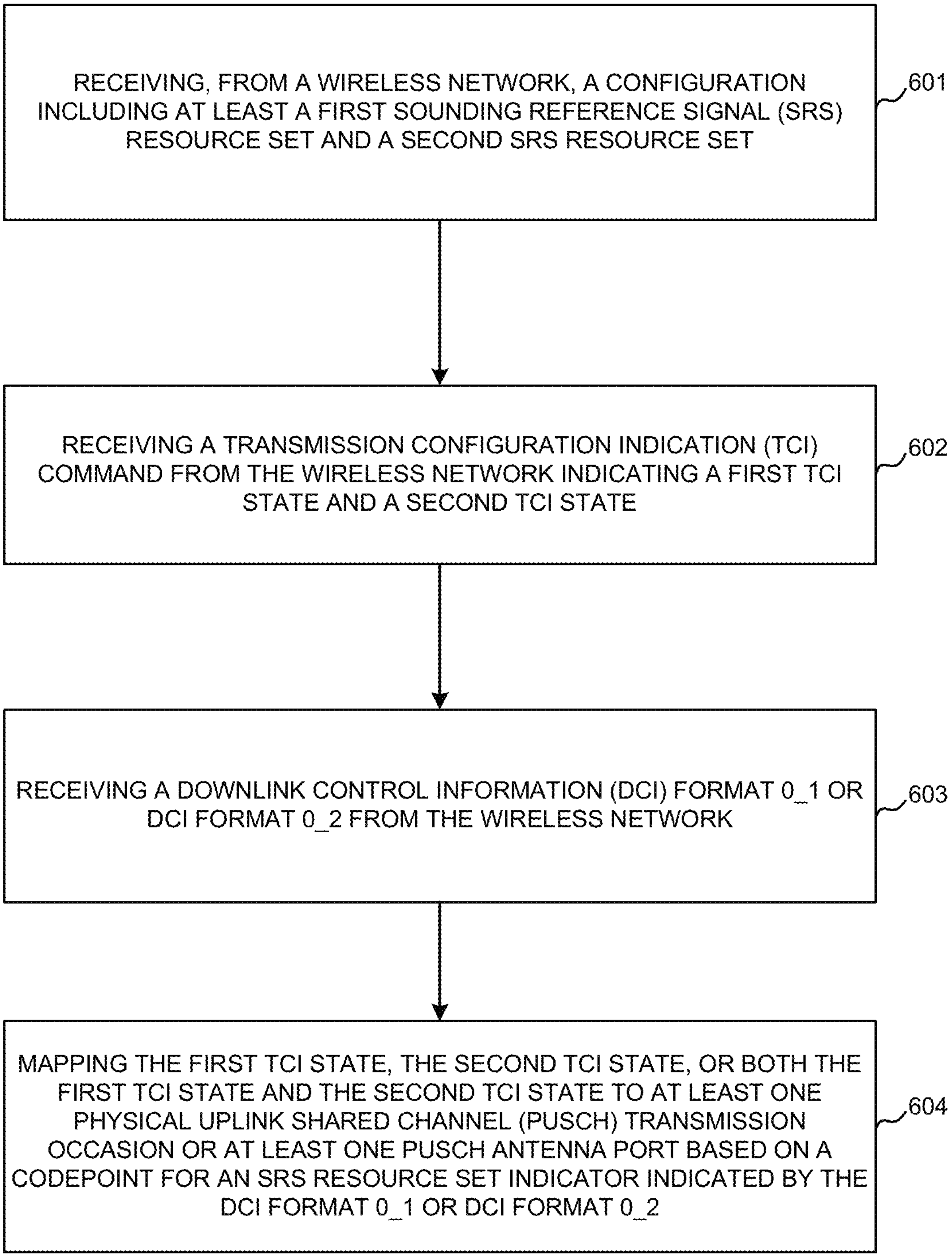
FIG. 6 illustrates an exemplary flow chart for the UE mapping the PUSCH transmission with TCI state based on DCI messages in accordance with embodiments of the current invention.

FIG. 6 illustrates an exemplary flow chart for the UE mapping the PUSCH transmission with TCI state based on DCI messages in accordance with embodiments of the current invention. At step 601, the UE receives a configuration including at least a first sounding reference signal (SRS) resource set and a second SRS resource set from a wireless network. In one embodiment, the UE is configured with multiple serving beams with at least a first serving transmission and reception point (TRP) and a second serving TRP. At step 602, the UE receives a transmission configuration indication (TCI) command from the wireless network indicating a first TCI state and a second TCI state. At step 603, the UE receives a downlink control information (DCI) format 0_1 or DCI format 0_2 from wireless network. At step 604, the UE maps the first TCI state, the second TCI state, or both the first TCI state and the second TCI state with at least one physical uplink shared channel (PUSCH) transmission occasion or at least one PUSCH antenna port based on a codepoint for an SRS resource set indicator indicated by the DCI format 0_1 or DCI format 0_2.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method for a user equipment (UE), comprising:

receiving, from a wireless network, a configuration including at least a first sounding reference signal (SRS) resource set and a second SRS resource set;

receiving a transmission configuration indication (TCI) command from the wireless network indicating a first TCI state and a second TCI state;

receiving a downlink control information (DCI) format 0_1 or DCI format 0_2 from the wireless network; and mapping the first TCI state, the second TCI state, or both the first TCI state and the second TCI state to at least one physical uplink shared channel (PUSCH) transmission occasion or at least one PUSCH antenna port based on a codepoint for an SRS resource set indicator indicated by the DCI format 0_1 or DCI format 0_2, wherein when the codepoint for the SRS resource set indicator indicates "10" or "11", the mapping is further based on whether a multi-panel scheme is configured to the UE by the wireless network, wherein the UE applies the first TCI state to one or more PUSCH transmission occasions associated with the first SRS resource set and the second TCI state to one or more PUSCH transmission occasions associated with the second SRS resource set when the multi-panel scheme is not configured to the UE by the wireless network, and wherein the UE applies the first TCI state to one or more PUSCH antenna ports associated with the first SRS resource set and the second TCI state to one or more PUSCH antenna ports associated with the second SRS resource set when the multi-panel scheme is configured to the UE by the wireless network.

2. The method of claim 1, wherein the first SRS resource set and the second SRS resource set are configured with usage for codebook or noncodebook.

3. The method of claim 2, wherein the UE applies the first TCI state to all PUSCH transmission occasions when the DCI format 0_1 or DCI format 0_2 indicates codepoint "00" for the SRS resource set indicator.

4. The method of claim 2, wherein the UE applies the second TCI state to all PUSCH transmission occasions when the DCI format 0_1 or DCI format 0_2 indicates codepoint "01" for the SRS resource set indicator.

5. The method of claim 1, wherein the multi-panel scheme configured to the UE by the wireless network is set to space division multiplexing (SDM) scheme.

6. The method of claim 1, wherein the first TCI state and the second TCI are joint or uplink (UL) TCI states.

7. The method of claim 1, wherein the TCI command is carried by a DCI or a medium access control-control element (MAC-CE) from the wireless network.

8. A user equipment (UE) comprising:

a transceiver that transmits and receives radio frequency (RF) signals in a wireless network;

a memory, and a processor coupled to the memory, the processor configured to receive a configuration including at least a first sounding reference signal (SRS) resource set and a second SRS resource set from the wireless network;

receive a TCI command from the wireless network indicating a first TCI state and a second TCI state; and receive a downlink control information (DCI) format 0_1 or DCI format 0_2 from the wireless network and maps the first TCI state, the second TCI state, or both the first TCI state and the second TCI state with at least one physical uplink shared channel (PUSCH) transmission occasion or at least one PUSCH antenna port based on a codepoint for an SRS resource set indicator indicated by the DCI format 0_1 or DCI format 0_2, wherein when the codepoint for the SRS resource set indicator indicates "10" or "11", the mapping is further based on whether a multi-panel scheme is configured to the UE by the wireless network, wherein the UE applies the first TCI state to one or more PUSCH transmission occasions associated with the first SRS resource set and the second TCI state to one or more PUSCH transmission occasions associated with the second SRS resource set when the multi-panel scheme is not configured to the UE by the wireless network, and wherein the UE applies the first TCI state to one or more PUSCH antenna ports associated with the first SRS resource set and the second TCI state to one or more PUSCH antenna ports associated with the second SRS resource set when the multi-panel scheme is configured to the UE by the wireless network.

9. The UE of claim 8, wherein the first SRS resource set and the second SRS resource set are configured with usage for codebook or noncodebook.

10. The UE of claim 9, wherein the UE applies the first TCI state to all PUSCH transmission occasions when the DCI format 0_1 or DCI format 0_2 indicates codepoint "00" for the SRS resource set indicator.

11. The UE of claim 9, wherein the UE applies the second TCI state to all PUSCH transmission occasions when the DCI format 0_1 or DCI format 0_2 indicates codepoint "01" for the SRS resource set indicator.

12. The UE of claim 8, the multi-panel scheme configured to the UE by the wireless network is set to SDM scheme.

13. The UE of claim 8, wherein the first TCI state and the second TCI are joint or uplink (UL) TCI states.

14. The UE of claim 8, wherein the TCI command is carried by a DCI or a media access control-control element (MAC-CE) from the wireless network.

* * * * *